United States Patent [19]
Shih et al.

[11] Patent Number: 6,011,096
[45] Date of Patent: Jan. 4, 2000

[54] PROCESS FOR PRODUCING A SUSPENSION OF A VINYLPYRIDINE POLYMER IN HIGH POLYMER PURITY

[75] Inventors: Jenn S. Shih, Paramus; Eduardo T. Yap, Franklin Lakes; John C. Hornby, Washington Township; Bala Srinivas, Hasbrouck Heights, all of N.J.

[73] Assignee: ISP Investments Inc., Wilmington, Del.

[21] Appl. No.: 09/211,909

[22] Filed: Dec. 15, 1998

[51] Int. Cl.$^7$ .................................. C08J 3/05; C08K 5/34
[52] U.S. Cl. ........................... 524/99; 524/457; 524/458; 525/191; 525/205; 525/218; 525/329.4; 525/333.3; 528/310; 528/502 A; 528/503
[58] Field of Search .............................. 524/99, 457, 458; 525/191, 205, 218, 329.4, 333.3; 528/310, 502 A, 503

[56] References Cited

U.S. PATENT DOCUMENTS

| | | | |
|---|---|---|---|
| 3,828,016 | 8/1974 | Bacskai | 260/88.3 R |
| 4,797,458 | 1/1989 | Sharaby | 526/194 |
| 4,824,910 | 4/1989 | Lutz | 525/185 |
| 4,931,518 | 6/1990 | Sharaby | 526/211 |
| 5,112,522 | 5/1992 | Sharaby | 252/182.3 |
| 5,244,995 | 9/1993 | Skillieorn et al. | 526/340 |
| 5,322,731 | 6/1994 | Callahan, Jr. et al. | 428/327 |
| 5,847,562 | 12/1998 | Sharaby | 526/211 |

*Primary Examiner*—Duc Truong
*Attorney, Agent, or Firm*—Marilyn J. Maue; William J. Davis; Walter Katz

[57] ABSTRACT

This invention relates to an improved free radical polymerization process for directly producing stable vinylpyridine polymer particles in an aqueous suspension and in a high state of polymer purity by effecting the polymerization in the presence of a water soluble suspension agent selected from the group of polyvinyl lactam, a hydroxy-containing polymer, a polyvinyl alcohol and a mixture thereof.

20 Claims, No Drawings

PROCESS FOR PRODUCING A SUSPENSION OF A VINYLPYRIDINE POLYMER IN HIGH POLYMER PURITY

BACKGROUND OF THE INVENTION

Vinylpyridine polymers are well known stabilizers and wicking inhibitors useful in the dye and ink jet-recording arts. Extensive research has been directed to processes for obtaining this polymer as easily isolatable microsized particles in a substantially pure state. Heretofore such processes comprise polymerizing the vinylpyridine monomer in aqueous alcohol solutions using water insoluble suspension agents namely a polyolefin or polyolefin carbonate suspension aids, as disclosed in U.S. Pat. Nos. 3,828,016; 3,947,526 and 4,824,910. However, these processes result in polyvinylpyridine (PVPYR) product intimately mixed with or embedded in the water insoluble suspension agent matrix. To recover the desired polyvinylpyridine it has been necessary to subject this product to a series of expensive and time consuming extractions with alcohol or other organic PVPYR solvents followed by solvent evaporation or other means of removal. The expense of producing the desired polymer in small particle size and in a high state of purity has limited its use in several potential applications as well as in the dye art.

It has also been found that poly(vinylpyridine) prepared by current methods is associated with non-uniformity in the black areas of images produced by ink jet recording. as discussed in the international PCT Patent WO 98/30392.

Accordingly, it is an object of this invention to provide a commercially feasible and economical process which overcomes the above disadvantages. Another object is to provide a process which produces the product in small bead-like particles from which PVPYR is directly recoverable in a substantially pure state. Still another object is to directly produce PVPYR in a stable condition suitable for storage, shipment. or direct use. These and other objects and advantages of this invention will become apparent from the following description and disclosure.

SUMMARY OF THE INVENTION

The novel process of this invention involves the water suspension polymerization of a vinylpyridine monomer, optionally mono- or di-substituted on the ring with $C_1$ to $C_4$ alkyl, in the presence of a water soluble suspension agent to produce the corresponding polymerized product as small particles from which substantially pure PVPYR or alkyl substituted PVPYR is directly recoverable by simply drying.

DETAILED DESCRIPTION OF THE INVENTION

The PVPYR or PVPYR alkyl substituted product of this invention is derived from the water suspension of a vinylpyridine monomer, optionally mono- or di-substituted with $C_1$ to $C_4$ alkyl, at a temperature of between about 40° and about 140° C., preferably between about 60° and about 100° C. The monomer, 5 to 70 wt. % in water, preferably 15 to 50 wt. % in water, optimally 20–30 wt. %, is charged to the reactor. The reaction is conducted in the presence of a water soluble suspension agent and a free radical polymerization initiator, such as a peroxide, perester, percarbonate, redox initiator or a diazo compound. The polymer product of this invention can be obtained in a wide range of molecular weights which include a weight average molecular weight of from about 5,000 to about 1,000,000, preferably from about 20,000 to about 500,000.

In the present process, the molecular weight of the product can be varied according to preference by several methods. For example, lower molecular weights are obtained at the higher temperatures within the above range, a higher concentration of initiator generally results in lower molecular weight product and the incorporation of a small amount, e.g. 0.5 to 20 wt. %, preferably 0.5 to 10 wt. %, of chain transfer agent, such as an alkyl thiol, isopropyl alcohol and the like, also provides lower molecular weight polymer.

The water soluble suspension agent of this invention is employed at a concentration of from about 0.5 to about 25 wt. %, preferably from about 1 to about 10 wt. %, based on total monomer. Suitable suspension agents for the product polymer include a poly vinyl lactam, particularly polyvinylpyrrolidone having a K value of 12 to 120, hydroxyethyl cellulose, a polyvinyl alcohol, carboxymethyl cellulose, polyethylene oxide (PEO), sodium polyacrylate, alkylated polyvinylpyrrolidone (GANEX polymer) and other inert water soluble types and mixtures thereof. Of these, polyvinylpyrrolidone and polyvinyl alcohol are preferred. The suspension agent can also be added with an appropriate emulsifier, hereinafter described.

The present polymerization is carried out with constant agitation and under a nitrogen purge. Initially a vinylpyridine monomer, suspension agent and water mixture is charged to the reactor at ambient temperature. Thereafter the mixture is heated to reaction temperature while the free radical initiator is added continuously or in increments during a 1 to 8 hour reaction period or until the monomer concentration in the reactor is below 1 wt. % The resulting PVPYR suspended in water is recovered as small particles as a stable bead. The suspension can be filtered and dried to produce a powder of high polymer purity or it can be used as is for quaternization as an effective water soluble dye transfer inhibitor, ink stabilizer and other uses for formulation in a composition as a stabilizing agent.

The vinylpyridine monomer employed herein can contain a controlled amount, less than 70 wt. %, of a comonomer for certain applications required by the consumer. Suitable comonomers include the free radical polymerizable components such as styrene, alkyl styrene, an alkyl (meth)acrylate, an alkyl (meth)acrylamide, a vinyl amide, N-vinylpyrrolidone, N-vinyl caprolactam, vinylimidazole in which case the copolymer is recoverable in the same state of purity and small particle size.

Specific examples of peroxy polymerization initiators employed in the process include t-butyl peroxy pivalate (LUPERSOL 11); t-amylperoxy pivalate (LUPERSOL 554); t-amyl-(2-ethylhexyl)peroxy carbonate (LUPERSOL TAEC); 1,1-di-(t-amylperoxy)cyclohexane (LUPERSOL 531); azo bis(2-methylbutyronitrile (VAZO 67); azo bis (isovaleronitrile (VAZO 52); azo bis(cyclohexane carbonitrile) (VAZO 88) and the like. And mixtures of the same. Low temperature initiators include the diacyl peroxides, diesters and azo compounds. High temperature initiators, which may be employed in the final stages of polymerization include 2,5-dimethyl-2,5-di-(t-butylperoxy) hexane (LUPERSOL 101); ethyl-2,5-di-(t-butylperoxy) hexane; dicumyl peroxide; t-butylcumyl peroxide; t-butylperoxy maleic acid; ethyl-3,3-di(t-butylperoxy) butyrate; di-t-butyl-diperoxy phthalate and the like.

If desired the polymerization reaction mixture can also contain up to about 10 wt. % of an emulsifier surfactant, based on total monomer, including cationic, non-ionic, anionic, amphoteric and zwitterionic emulsifier, such as one or a mixture of those disclosed at columns 8–16 of U.S. Pat.

No. 5,458,809; incorporated herein by reference. Specific examples of these water soluble emulsifiers include an alkali metal sulfonate such as sodium or potassium dodecylbenzene sulfonate (LAS); coconut trimethyl ammonium chloride or bromide, N-coco-3-aminopropionic acid, triethanol oleate, sodium or potassium oleate, N-cetyl-N-ethyl morpholinium ethosulfate, sodium or potassium lauryl sulfate, lauryl alcohol polyether, polyethoxylated sorbitan monolaurate (TWEEN 20) and the like or a mixture thereof in the presence or absence of a suspension agent.

Having generally described the invention, reference is now had to the following examples which illustrate preferred embodiments but which are not to be construed as limiting to the scope of the invention as set forth in the appended claims.

EXAMPLE 1

Into a one liter four-neck resin kettle, fitted with a half-moon Teflon blade agitator, a nitrogen purge adapter and a reflux condenser, a mixture of 60 g. of 4-vinyl pyridine monomer, 3.0 g. of K-30 poly(vinylpyrrolidone) and 240 g. of water was charged. The nitrogen purge was begun and continued throughout the experiment. The above mixture at ambient temperature was then gradually heated and held at 85° C. for 30 minutes while operating the blade agitator at 350 rpm. An initial charge of 1.0 g. of t-butyl peroxypivalate (Lupersol 11) was added to the mixture and agitation was continued for one hour; after which 0.5 g. of Lupersol 101 was added and the temperature in the kettle was raised to 110° C. the reaction continued under agitation for an additional 8 hours until only a trace of unconverted monomer remained. The resulting poly(4-vinylpyridine) of molecular weight about 100,000 was recovered as a water suspension of 95 wt. % microparticles of substantially pure poly(4-vinylpyridine).

EXAMPLE 2

Into a one liter four-neck resin kettle, fitted with a half-moon Teflon blade agitator, a nitrogen purge adapter and a reflux condenser was charged a mixture of 60 g. of 4-vinyl pyridine monomer, 3.0 g. of K-90 poly (vinylpyrrolidone) and 240 g. of water. The nitrogen purge was begun and continued throughout the experiment. The above mixture at ambient temperature was then gradually heated and held at 85° C. for 30 minutes while operating the blade agitator at 350 rpm . An initial charge of 0.6 g. of t-butyl peroxypivalate (Lupersol 11) was added to the mixture and agitation was continued for one hour; after which additional charges of 0.3 g. of Lupersol 11 was added every hour over a 5 hour period. until only a trace of unconverted monomer remained. The resulting poly(4-vinylpyridine) of higher molecular weight than obtained in Example 1 was recovered as a water suspension of microparticles of substantially pure polyvinyl pyridine.

EXAMPLES 3 AND 4

Example 2 was twice repeated except that in one case 1.8 g of K-30 poly(vinyl pyrrolidone) was substituted for 3.0 g of K-90 poly(vinylpyrrolidone) and in the second case 3.0 g. of K-30 PVP was substituted. The results were substantially the same.

EXAMPLE 5

Into a one-liter four-neck resin kettle, fitted with a stainless steel anchor agitator, a nitrogen purge adapter and a reflux condenser, a mixture of 60 g. of 4-vinylpyridine monomer, 3.0 g. of hydroxyethyl cellulose and 240 g. of water were charged. The nitrogen purge was begun and continued throughout the experiment. The above mixture at ambient temperature was then gradually heated and held at 85° C. for 30 minutes while operating the anchor agitator at 350 rpm. An initial charge of 1.0 g. of t-butyl peroxypivalate (Lupersol 11) was added to the mixture and agitation was continued for one hour; after which 0.5 g. of Lupersol 11 was added every hour over a 8 hour period until the 4-vinylpyridine was less than 0.5%. The resulting poly(4-vinylpyridine) was recovered by filtering and drying with 85% yield.

EXAMPLE 6

Into a one-liter four-neck resin kettle, fitted with a stainless steel anchor agitator, a nitrogen purge adapter and a reflux condenser, a mixture of 60 g. of 4-vinylpyridine monomer, 0.6 g. of hydroxyethyl cellulose and 240 g. of water were charged. The nitrogen purge was begun and continued throughout the experiment. The above mixture at ambient temperature was then gradually heated and held at 90° C. for 30 minutes while operating the anchor agitator at 350 rpm. An initial charge of 1.0 g. of t-butyl peroxypivalate (Lupersol 11) was added to the mixture and agitation was continued for one hour; after which 0.5 g. of Lupersol 11 was added every hour over a 8 hour period until the 4-vinylpyridine was less than 0.5%. The resulting poly(4-vinylpyridine) was recovered by filtering and drying with 92% yield.

EXAMPLE 7

Into a one-liter four-neck resin kettle, fitted with a stainless steel anchor agitator, a nitrogen purge adapter and a reflux condenser, a mixture of 60 g. of 4-vinylpyridine monomer, 3.0 g. of K-30 poly(vinylpyrrolidone) and a mixture of 210 g. of water and 30 g. of isopropanol were charged. The nitrogen purge was begun and continued throughout the experiment. The above mixture at ambient temperature was then gradually heated and held at 100° C. for 30 minutes while operating the anchor agitator at 350 rpm. An initial charge of 5.0 g. of t-butyl peroxypivalate (Lupersol 11) was added to the mixture and agitation was continued for one hour; after which 1.0 g. of Lupersol 11 was added every hour over a 8 hour period until the 4-vinylpyridine was less than 0.5%. The resulting poly(4-vinylpyridine) was recovered by filtering and drying with 80% yield. The molecular weight of this polymer is about 50,000.

EXAMPLE 8

Into a one-liter four-neck resin kettle, fitted with a stainless steel anchor agitator, a nitrogen purge adapter and a reflux condenser, a mixture of 60 g. of 4-vinylpyridine monomer, 3.0 g. of dodecyl benzene sulfonate (LAS) and a mixture of 240 g. of water are charged. The nitrogen purge was begun and continued throughout the experiment. The above mixture at ambient temperature was then gradually heated and held at 85° C. for 30 minutes while operating the anchor agitator at 350 rpm. An initial charge of 1.0 g. of t-butyl peroxypivalate (Lupersol 11) was added to the mixture and agitation was continued for one hour; after which 0.5 g. of Lupersol 11 was added every hour over a 8 hour period until the 4-vinylpyridine was less than 0.5%. The resulting poly(4-vinylpyridine) was recovered by filtering and drying with 85% yield. The molecular weight of this polymer is about 100,000.

EXAMPLE 9

Into a one-liter four-neck resin kettle, fitted with a stainless steel anchor agitator, a nitrogen purge adapter and a reflux condenser, a mixture of 60 g. of 4-vinylpyridine monomer, 0.6 g. of K-30 poly(vinylpyrrolidone), 3.0 g. of dodecyl benzene sulfonate and 240 g. of water are charged. The nitrogen purge was begun and continued throughout the experiment. The above mixture at ambient temperature was then gradually heated and held at 85° C. for 30 minutes while operating the anchor agitator at 350 rpm. An initial charge of 1.0 g. of t-butyl peroxypivalate (Lupersol 11) was added to the mixture and agitation was continued for one hour; after which 0.5 g. of Lupersol 11 was added every hour over a 8 hour period until the 4-vinylpyridine was less than 0.5%. The resulting poly(4-vinylpyridine) was recovered as a water suspension.

EXAMPLE 10

Into a one-liter four-neck resin kettle, fitted with a stainless steel anchor agitator, a nitrogen purge adapter and a reflux condenser, a mixture of 50 g. of 4-vinylpyridine monomer and 10 g. of lauryl methacrylate, 3.0 g. of K-30 poly(vinylpyrrolidone) and 240 g. of water are charged. The nitrogen purge was begun and continued throughout the experiment. The above mixture at ambient temperature was then gradually heated and held at 85° C. for 30 minutes while operating the anchor agitator at 350 rpm. An initial charge of 1.0 g. of t-butyl peroxypivalate (Lupersol 11) was added to the mixture and agitation was continued for one hour; after which 0.5 g. of Lupersol 11 was added every hour over a 8 hour period until the 4-vinylpyridine was less than 0.5%. The resulting poly(4-vinylpyridine) was recovered by filtering and drying with 85% yield.

EXAMPLE 11

Into a one-liter four-neck resin kettle, fitted with a stainless steel anchor agitator, a nitrogen purge adapter and a reflux condenser, a mixture of 50 g. of 4-vinylpyridine and 10 g. of vinylpyrrolidone monomers, 0.6 g. of K-30 poly (vinylpyrrolidone) and 240 g. of water were charged. The nitrogen purge was begun and continued throughout the experiment. The above mixture at ambient temperature was then gradually heated and held at 85° C. for 30 minutes while operating the anchor agitator at 350 rpm. An initial charge of 1.0 g. of t-butyl peroxypivalate (Lupersol 11) was added to the mixture and agitation was continued for one hour; after which 0.5 g. of Lupersol 11 was added every hour over a 8 hour period until the 4-vinylpyridine was less than 0.5%. The resulting poly(4-vinylpyridine) was recovered as a water suspension.

EXAMPLE 12

Into a one-liter four-neck resin kettle, fitted with a stainless steel anchor agitator, a nitrogen purge adapter and a reflux condenser, a mixture of 75 g. of 4-vinylpyridine and 25 g. of vinylpyrrolidone monomers, 400 g. of water were charged. The nitrogen purge was begun and continued throughout the experiment. The above mixture at ambient temperature was then gradually heated and held at 85° C. for 30 minutes while operating the anchor agitator at 350 rpm. An initial charge of 2.0 g. of t-butyl peroxypivalate (Lupersol 11) was added to the mixture and agitation was continued for one hour; after which 0.5 g. of Lupersol 11 was added every hour over a 8 hour period until the 4-vinylpyridine was less than 0.5%. The resulting poly(4-vinylpyridine) was recovered as a water suspension.

EXAMPLE 13

Into a one-liter four-neck resin kettle, fitted with a stainless steel anchor agitator, a nitrogen purge adapter and a reflux condenser, a mixture of 60 g. of 2-vinylpyridine monomer, 3.0 g. of K-30 poly(vinylpyrrolidone) and 240 g. of water were charged. The nitrogen purge was begun and continued throughout the experiment. The above mixture at ambient temperature was then gradually heated and held at 85° C. for 30 minutes while operating the anchor agitator at 350 rpm. An initial charge of 1.0 g. of t-butyl peroxypivalate (Lupersol 11) was added to the mixture and agitation was continued for one hour; after which 0.5 g. of Lupersol 11 was added every hour over a 16 hour period until the 2-vinylpyridine was less than 0.5%. The resulting poly(2-vinylpyridine) was recovered as a water suspension.

EXAMPLE 14

Into a one-liter four-neck resin kettle, fitted with a stainless steel anchor agitator, a nitrogen purge adapter and a reflux condenser, 3.0 g. of K-30 poly(vinylpyrrolidone) and 240 g. of water were charged. The nitrogen purge was begun and continued throughout the experiment. The above mixture at ambient temperature was then gradually heated and held at 85° C. for 30 minutes while operating the anchor agitator at 350 rpm. An initial charge of 1.0 g. of t-butyl peroxypivalate (Lupersol 11) was added and then 60 g. of 4-vinylpyridine monomer was gradually added into the mixture through the dropping funnel over a period of 2 hours; after which 0.5 g. of Lupersol 11 was added every hour over a 8 hour period until the 4-vinylpyridine was less than 0.5%. The resulting poly(4-vinylpyridine) was recovered as a water suspension.

EXAMPLE 15

Example 10 was repeated except that 45 g. of 4-vinylpyridine and 15 g. vinylpyrrolidone were substituted for 50 g. 4-vinylpyridineand 10 g lauryl methacrylate.

EXAMPLE 16

Into a one-liter four-neck resin kettle, fitted with a stainless steel anchor agitator, a nitrogen purge adapter and a reflux condenser, a mixture of 60 g. of 4-vinylpyridine monomer, 3.0 g. of poly(vinyl alcohol) (98% hydrolysis) and 240 g. of water were charged. The nitrogen purge was begun and continued throughout the experiment. The above mixture at ambient temperature was then gradually heated and held at 90° C. for 30 minutes while operating the anchor agitator at 350 rpm. An initial charge of 1.0 g. of t-butyl peroxypivalate (Lupersol 11) was added to the mixture and agitation was continued for one hour; after which 0.5 g. of Lupersol 11 was added every hour over an 8 hour period until the 4-vinylpyridine was less than 0.5%. The resulting poly(4-vinylpyridine) was recovered by filtering and drying with 90% yield.

EXAMPLE 17

Into a one-liter four-neck resin kettle, fitted with a stainless steel anchor agitator, a nitrogen purge adapter and a reflux condenser, a mixture of 60 g. of 4-vinylpyridine monomer, 3.0 g. of poly(vinyl alcohol) (88% hydrolysis) and 240 g. of water were charged. The nitrogen purge was begun and continued throughout the experiment. The above mixture at ambient temperature was then gradually heated and held at 90° C. for 30 minutes while operating the anchor agitator at 350 rpm. An initial charge of 1.0 g. of t-butyl peroxypivalate (Lupersol 11) was added to the mixture and agitation was continued for one hour; after which 0.5 g. of Lupersol 11 was added every hour over an 8 hour period until the 4-vinylpyridine was less than 0.5%. The resulting poly(4-vinylpyridine) was recovered.

EXAMPLE 18

Into a one-liter four-neck resin kettle, fitted with a stainless steel anchor agitator, a nitrogen purge adapter and a reflux condenser, a mixture of 60 g. of 4-vinylpyridine monomer, 3.0 g. of poly(vinyl alcohol) (98% hydrolysis) and 240 g. of water were charged. The nitrogen purge was begun and continued throughout the experiment. The above mixture at ambient temperature was then gradually heated and held at 90° C. for 30 minutes while operating the anchor agitator at 350 rpm. An initial charge of 1.0 g. of Vazo 67 was added to the mixture and agitation was continued for one hour; after which 0.5 g. of Vazo 67 was added every hour over an 8 hour period until the 4-vinylpyridine was less than 0.5%. The resulting poly(4-vinylpyridine) was recovered by filtering and drying with 90% yield.

While the above examples illustrate preferred embodiments, it will be understood that many modifications and substitutions can be made therein without departing from the scope of this invention. For example, vinylpyridine copolymers described in the foregoing disclosure can be substituted to provide the corresponding copolymers in a substantially pure, particulate state as a dried powder or as a stable suspension. Also other water soluble suspension agents which are inert with respect to the monomeric mixture and polymer product can be substituted in the process to provide similar beneficial affect. These and many other changes and additions can be incorporated in the examples and are within the scope of this invention.

What is claimed is:

1. An improved process for the preparation of a vinylpyridine polymeric product which comprises:
   (a) mixing water with a N-vinylpyridine monomer optionally mono- or di-substituted on the ring with $C_1$ to $C_4$ alkyl in the presence of between about 0.5 and about 25 wt. %, based on total monomer, of a water soluble suspension agent at below polymerization temperature;
   (b) gradually heating the mixture of (a) to polymerization temperature while introducing a polymerization initiating amount of a free radical polymerization initiator;
   (c) polymerizing the monomer while adding portions of initiator throughout the polymerization and continuing the polymerization reaction until the monomer concentration is below 1 wt. % and
   (d) recovering the resulting vinylpyridine polymer product in water as a stable suspension of substantially pure polymer microparticles.

2. The process of claim 1 wherein water is removed from the product, the product is washed to remove traces of suspension agent and residual vinylpyridine and dried to a pure polymeric powder.

3. The process of claim 1 wherein said suspension agent in said mixture is between about 1 and about 10 wt. % with respect to monomer.

4. The process of claim 3 wherein said suspension agent is selected from the group consisting of K-12 to K-120 polyvinyl lactam, a hydroxy-containing polymer, a polyvinyl alcohol, polyethylene oxide, sodium polyacrylate, alkylated polyvinylpyrrolidone and mixtures thereof.

5. The process of claim 4 wherein said suspension agent is K-20 to K-90 polyvinylpyrrolidone.

6. The process of claim 4 wherein said suspension agent is hydroxyethyl cellulose, carboxymethyl cellulose or polyvinyl alcohol.

7. The process of claim 1 wherein said vinyl pyridine monomer is unsubstituted 2-vinyl pyridine or 4-vinyl pyridine.

8. The process of claim 1 wherein said vinylpyridine monomer contains less than 70 wt. % of a polymerizable comonomer.

9. The process of claim 8 wherein said comonomer is selected from the group consisting of styrene, lower alkyl styrene, lower alkyl acrylate, lower alkyl methacrylate, N-vinylpyrrolidone, N-vinyl caprolactam, acrylamide, methacrylamide, vinylimidazole, a vinyl amide and a mixture thereof.

10. The process of claim 1 wherein said polymerization initiator is selected from the group consisting of a peroxide, a perester, a percarbonate, a diazo and a redox initiator.

11. The process of claim 10 wherein said initiator is a peroxide initiator.

12. The process of claim 11 wherein said initiator is t-butyl peroxypivalate.

13. The process of claim 1 wherein the reaction mixture additionally contains between about 0.5 and about 20 wt. % of a chain transfer agent.

14. The process of claim 13 wherein said chain transfer agent is selected from the group consisting of a $C_4$ to $C_{14}$ thiol and isopropyl alcohol.

15. The process of claim 1 wherein the polymerization reaction is carried out at a polymerization temperature of between about 40° and 140° C.

16. The process of claim 15 wherein the vinylpyridine product is poly(vinylpyridine) having a weight average molecular weight of between about 5.000 and about 1,000,000.

17. The process of claim 14 wherein the poly(vinylpyridine) has a weight average molecular weight of between about 20,000 and about 500,000.

18. The process of claim 1 wherein said mixture additionally contains an effective micel forming amount of an emulsifier.

19. The process of claim 18 wherein said emulsifier is an alkali metal sulfonate.

20. The process of claim 19 wherein the alkali metal sulfonate is sodium dodecylbenzene sulfonate.

* * * * *